M. D. GROSS.
JOINT.
APPLICATION FILED OCT. 28, 1918.
1,307,122.
Patented June 17, 1919.
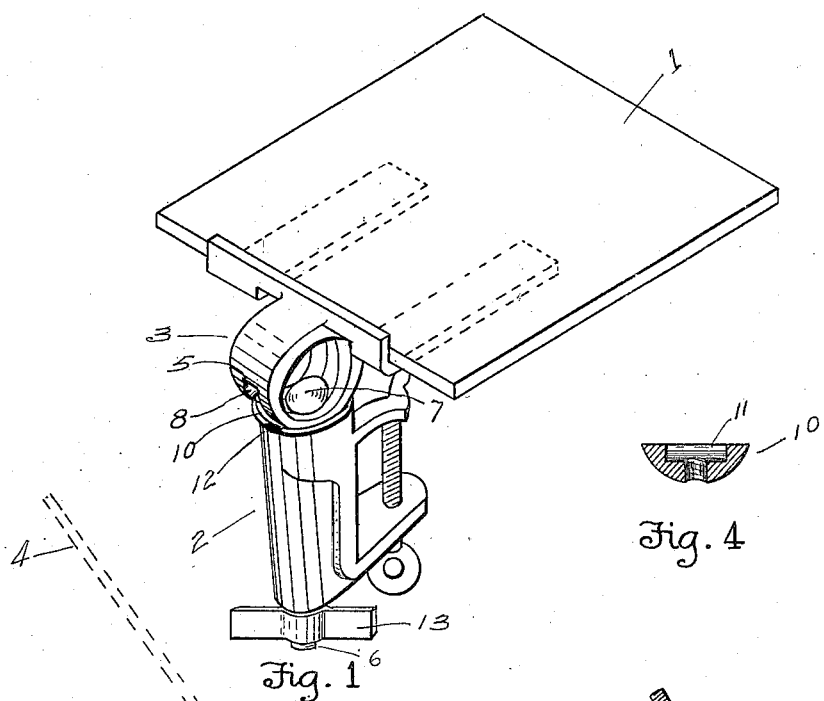
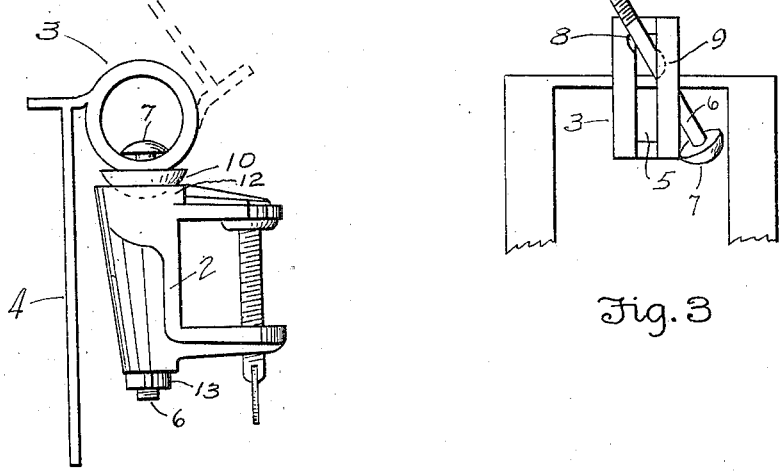
Inventor
MILO D. GROSS
By E. E. Sauzé
Attorney.

UNITED STATES PATENT OFFICE.

MILO D. GROSS, OF WALLA WALLA, WASHINGTON.

JOINT.

1,307,122.  Specification of Letters Patent.  Patented June 17, 1919.

Application filed October 28, 1918. Serial No. 259,979.

*To all whom it may concern:*

Be it known that I, MILO D. GROSS, a citizen of the United States, residing at Walla Walla, in the county of Walla Walla and State of Washington, have invented certain new and useful Improvements in Joints, of which the following is a specification.

This invention relates to an improvement in joints and has for its object to provide a joint having a wide range of movement either in a vertical or horizontal plane, and either independently or conjointly, and which may be securely held in the desired position.

That the invention may be better understood reference is had to the accompanying drawings, in which—

Figure 1 is an isometric view of a table and clamp, showing the application of a joint;

Fig. 2 is a side elevation showing range of movement in a vertical plane;

Fig. 3 is a plan view from below showing provision for inserting the bolt; and

Fig. 4 is a section of the washer.

While the drawing shows one application of my invention it will be understood that it is equally applicable to many uses.

Referring specifically to the drawings 1 indicates a table and 2 a clamp by which the table may be attached to a chair, desk or other object.

Located between the clamp and table is my joint which is composed of a ring 3 having a portion, or arms, 4 extending outward from the ring. In the ring is a peripheral slot 5 extending nearly, or quite, around the ring, and through this slot is passed a bolt 6 the head of which rests against the interior periphery of the ring 3.

That the joint may work truly and without lost motion the slot 5 is of a width slightly in excess of the bolt's diameter, and as the bolt has a greater length than the diameter of the ring 3 provision must be made whereby the bolt 6 may be easily inserted in the slot 5 for assembling; this is provided for by forming a recess 8 in the outer portion of the ring 3 adjacent to the slot 5 and a corresponding recess 9 in the inner portion of the ring adjacent to the slot 5 and in diametral line with the first mentioned recess 8, as shown in Fig. 3.

By locating the recesses in this manner ample room for inserting the bolt 6 is provided, no material weakening of the ring 3 occurs, and the interior periphery of the ring remains relatively smooth to accommodate the bolt head 7 which rests in frictional contact therewith.

The ring 3 is slidably mounted in a washer 10 which is channeled, 11, to engage the ring thus holding the washer in fixed relation to the ring with respect to its horizontal rotation.

The reverse side of the washer may be convex, or of any desired form to seat well in the support 12, the preferred form however is convex giving a concave form to the seat in the support which may then be used to seat the ring 3 without the washer 10 if desired, thus dispensing with the washer.

The bolt 6 passes through the slot 5, the washer 10, and the support 12, and to draw the whole together and hold the parts in frictional contact a thumbnut 13, as shown in the drawings, or any suitable nut may be used.

In use the clamp is fastened to a chair, table, or other object, the table 1 brought to the desired position and the thumbnut 13 tightened. This action brings the head of the bolt in frictional contact with the interior periphery of the ring and holds the whole rigidly together.

When not in use the table may be dropped to the position shown in Fig. 2, this movement being accomplished by loosening the thumbnut 13, moving the table over the outer portion of the clamp and dropping it to the position shown.

It will be noted, by referring to Fig. 2, that only the edge of the bolt head 7 is in contact with the inner surface of the ring 3; any pressure then, which occurs on the table 1 exerts a lifting pressure on the bolt head, on its opposite side from the table, using the side of the washer under the table 1 as a fulcrum. There is therefore a cramping between the head 7, ring 3, and washer 10 which prevents slipping with very little pressure from the thumbnut 13.

Having thus described my invention, I claim:

In a joint, a ring, arms extending from the ring, a peripheral slot in the ring, a recess in the outer portion of the ring adjacent to the slot, a corresponding recess in the inner portion of the ring adjacent to the slot, in diametral line with the first mentioned recess, a bolt positioned in the peripheral slot, with the head of said bolt in frictional contact with the interior periphery of the ring, a support, a washer interposed between the support and the ring, said support and said washer encompassing the above mentioned bolt, and a thumbnut in threaded engagement with the bolt.

In testimony whereof I affix my signature.

MILO D. GROSS.

Witnesses:
G. S. BOND,
HAZEL ANDERSON.

Copies of this patent may be obtained for five cents each, by addressing the "Commissioner of Patents, Washington, D. C."